United States Patent [19]
Nelson

[11] 3,891,159
[45] June 24, 1975

[54] GUIDE ROLLER BIASING SHIM LINER

[75] Inventor: Norman E. Nelson, Roseville, Minn.

[73] Assignee: Minnesota Mining and Manufacturing Company, St. Paul, Minn.

[22] Filed: Mar. 20, 1974

[21] Appl. No.: 452,725

Related U.S. Application Data

[63] Continuation-in-part of Ser. No. 354,170, April 25, 1973, abandoned.

[52] U.S. Cl. .................... 242/199; 242/76
[51] Int. Cl. .................... G11b 23/10
[58] Field of Search .......... 242/199, 200, 198, 197, 242/76; 360/93, 96; 352/72, 78 R

[56] References Cited

UNITED STATES PATENTS 3,556,434 1/1971 Koeppe .................... 242/199
3,675,875 7/1972 Schmidt .................... 242/199
3,712,559 1/1973 Schwartz .................... 242/199

*Primary Examiner*—George F. Mautz
*Attorney, Agent, or Firm*—Alexander, Sell, Steldt & DeLaHunt

[57] ABSTRACT

A recording tape cassette shim liner is formed from a resilient sheet having a pair of integral tabs overlying recessed areas in one of the sidewalls of a cassette case. A pair of rotatable tape guide rollers have ends that protrude into the sidewall recessed areas so that the liner tabs extend between the ends of the rollers and the case sidewall and prevent the rollers from oscillating on the shafts on which they are mounted. A number of radial creases are formed on the liner and present ridges that face away from the tape supporting spools of the cassette to provide a low friction support for the spools.

5 Claims, 5 Drawing Figures

GUIDE ROLLER BIASING SHIM LINER

CROSS-REFERENCE

This application is a continuation-in-part of application Ser. No. 354,170, filed Apr. 25, 1973, now abandoned.

BACKGROUND OF THE INVENTION

1. Field of the Invention

The present invention relates in general to magnetic recording tape cassettes and more specifically to a shim liner for cassettes having rotatable tape guide rollers.

2. Description of the Prior Art

A typical tape cassette as introduced in about 1965 by N. V. Phillips includes a case with spaced apart sidewalls, a pair of rotatable tape supporting spools journaled on two cylindrical ribs at openings in the sidewalls, and a pair of tape guide rollers that may either be fixed or rotatably pin mounted. Rotatable tape guide rollers in such cassettes are advantageous because they produce minimal drag on the tape and thereby reduce the torque required to advance the tape. However, in the past it has been a problem to efficiently and economically produce rotatable rollers of proper dimensions. If too small a bearing clearance, the rollers will bind in the case; if too large a clearance, they will oscillate on their pin shafts and when driven at high speeds produce an irritating noise. A lowering of the quality of the reproduction of the recorded format on the tape they guide as a result of such oscillation can also occur.

It is known to use small coil springs in conjunction with rotatable rollers to exert a biasing force on the rollers and thereby limit the oscillation of the rollers on their pin shafts. A second known method for preventing roller oscillation is to use machined rollers produced with extremely high dimensional precision. Although the employment of either biasing springs or carefully machined rollers has proved to be operationally satisfactory, both of these methods for eliminating roller oscillation require undesirable expense in manufacturing and assembling costs.

A second problem in cassette design involves the centering of the tape spools within the cassette case by a pair of low friction liners to reduce the friction between the tape and the sidewalls of the case. Various forms of liners are known in the art as evidenced by U.S. Pat. Nos. 3,027,110, 3,529,788 and 3,556,433. Several other patents teach the forming of creases in a liner to increase the centering forces provided thereby as illustrated by U.S. Pat. No. 3,675,875, that shows a liner with numerous parallel creases, and No. 3,712,559, showing a liner having a number of radial creases. The creases in both of these references ridge against the tape and spools to provide sufficient centering forces. However, rubbing of the tape against the shim ridges produces substantial wear on the liners, and in fact the liners may at times even be cut by the tape. Wear at the shim ridges is especially harmful if the low friction properties of the liner is provided by a lubricant coating that can be worn through by the cutting effect of the tape.

SUMMARY OF THE INVENTION

The present invention provides an improved shim liner for a magnetic tape cassette and includes a resilient sheet with outwardly extending portions that extend between one of the assembly sidewalls and the tape guide rollers. Due to the resiliency of the liner, a biasing force is exerted upon the tape guide rollers by the liner to substantially reduce the oscillation of the rollers on their pin shaft mountings. Accordingly, the rollers may be manufactured with economical dimensional tolerances, and the biasing effect of the liners compensates for variations in the ultimate sizes of the rollers.

A further aspect of the present invention is the inclusion of a number of radial creases in the liner, which creases ridge away from the tape and spools of the assembly and extend radially outward from central portions of the liner. In this way, the centering force provided by the liner on the tape spools of the assembly is greater than that provided by liners with no creases, and is substantially equal to that provided by liners having creases that ridge against the tape spools. However, because the creases of the present invention ridge away from the tape spools of the cassette, centering forces are applied on the tape spool by the relatively large areas of the liner between the creases. Thus, the centering forces exerted on the tape spools by the present invention are not concentrated on the liner creases and wear on the creases due to contact with the tape is minimized by increasing the surface contact between the tape and the liner.

DESCRIPTION OF THE PREFERRED EMBODIMENTS

Figure 1:
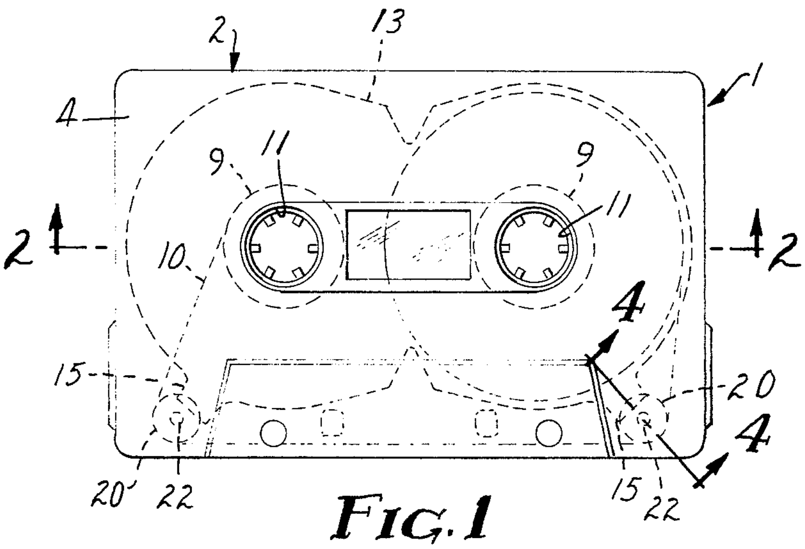
FIG. 1 is a plan view of a typical tape cassette with a shim liner that represents a first embodiment of the present invention and the internal components of the assembly indicated in dotted lines.
Figure 2:
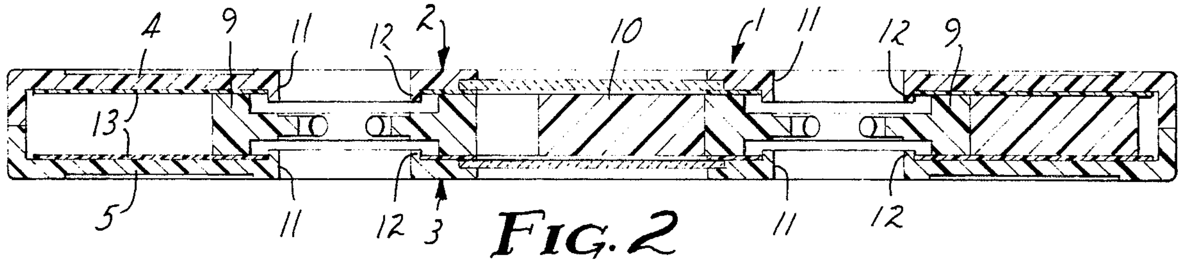
FIG. 2 is a view in cross section taken through the plane 2—2 indicated in FIG. 1.

A typical recording tape cassette, as shown in FIG. 1, has a hollow plastic case 1 that is rectangular in shape and is formed from a pair of casing members 2 and 3 held together by arc welding, screws or other suitable fastening methods. The casing members 2 and 3 each include a substantially planar sidewall 4 and 5 respectively, and these sidewalls are sufficiently spaced apart from one another to accommodate a pair of disk like spools 9 around which a tape 10 is wound. Referring now also to FIG. 2, two circular openings 11 are formed in each sidewall 4 and 5, and the spools 9 are journaled on cylindrical ribs 12 formed by a lip on each of the inner margins of the openings 11.

Figures 3, 4:
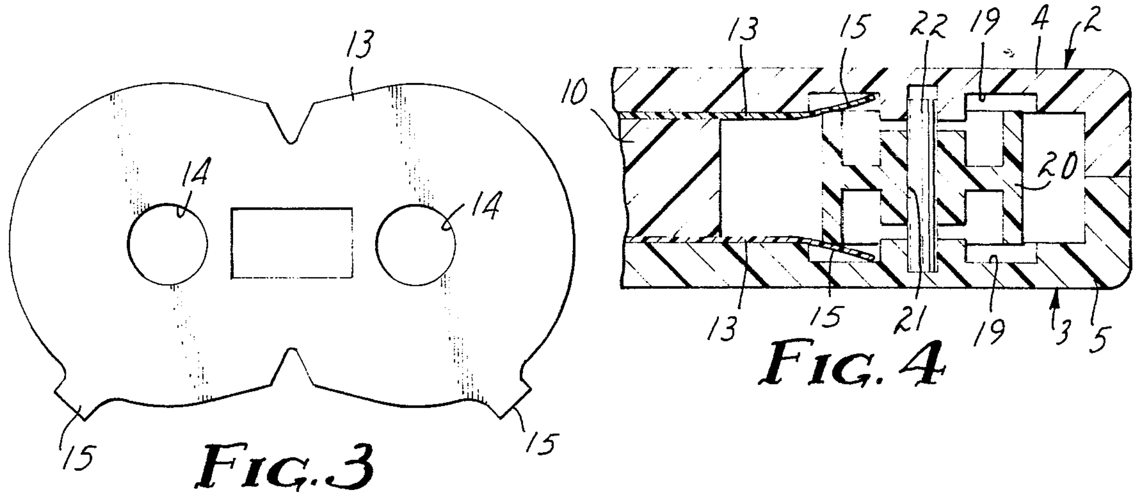
FIG. 3 is a plan view of the shim liner of FIG. 1.
FIG. 4 is an enlarged view in cross section taken through the plane 3—3 of FIG. 1.

Interposed between each sidewall 4 and 5 and the spools 9 are a pair of flat, resilient shim liners 13 that represent a first embodiment of the present invention. Each liner 13 is preferably formed from a sheet with a polyester composition and is coated on the side facing the tape spools with graphite or other such lubricant. However, the liner 13 may also be formed with the lubricant included as a homogeneous part of the liner, instead of merely as a coating, similar to a presently existing liner that is formed of a composition of a high density polyethylene base with a graphite lubricant interspersed throughout. Referring now to FIG. 3, each liner 13 has a pair of circular openings 14 through which the ribs of the sidewalls 4 and 5 protrude to serve as alignment means for aiding in properly positioning the liners 13 in the case 1.

The primary function of liners such as the liners 13 has heretofore been to support the spools 9, reducing the friction between the spools and the edges of the tape 10 and the sidewalls 4 and 5. However, the liners 13 have a pair of outwardly extending portions in the form of integral tabs 15 that protrude from the main body of each liner, and when the liners are in their proper positions within the case 1 the tabs 15 overlie two pairs of opposed recessed areas 19 formed in the sidewalls 4 and 5, and each opposed pair is adjacent one of the spools 9. As shown most clearly in FIG. 4, the tabs 15 extend between the recessed areas 19 and the ends of a pair of tape guiding rollers 20 positioned near one edge of the periphery of the case 1. The tabs 15 are shown in FIG. 4 as partially overlying the areas 19, but this is not essential to the present invention and the tabs may entirely overlie the areas 19.

Referring now to both FIGS. 1 and 4, during operation of the cassette on a tape transport, the tape 10 travels between the spools 9 and is guided in such travel by the rollers 20 which are basically cylindrical in shape. Each roller 20 has a central aperture 21 and rotatably mounts on a pin shaft 22 centrally protruding from the areas 19 of the sidewall 5. Each roller bridges between and has ends that protrude into the recessed areas 19 of the sidewalls 4 and 5 to bear against the tabs of the liners 13. The rollers 20 exert pressure on the liner tabs 15, urging the tabs into the recessed areas 19 of the sidewalls 4 and 5. Due to the resiliency of the liners 13, the tabs 15 exert an opposite biasing force against the rollers 20. Therefore, although the rollers 20 are not tightly held between the sidewalls 4 and 5, oscillation of the rollers on the shafts 22 is minimized by the liners 13.

Figure 5:
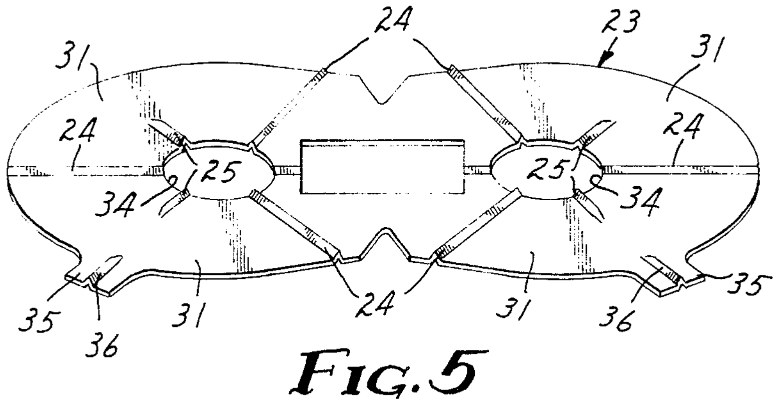
FIG. 5 is a perspective view of a second embodiment of the present invention.

As indicated in FIGS. 1, 2 and 3, the liner 13 is entirely flat, but such flatness is not essential to the present invention. In certain instances it may be desirable to increase the supporting pressure exerted by the liners 13 on the spools 9. Such pressure increase may be accomplished by forming creases in the liners 13 either by heat forming or plastic deformation. A second embodiment of the present invention is shown in FIG. 5 wherein there is a shim liner 23 with a low friction coating on one side and is basically the same as the liner 13 except that a number of alternate radial creases 24 and 25 are formed in the body of the liner 23 so that the ridges formed by the creases are on the other side of the liner. When the liner 23 is employed in the case 1 it should be positioned with the creases 24 and 25 ridging against one of the sidewalls 4 and 5. Accordingly, the portions of the liner 23 that bear against the spools and tape are relatively broad areas 31 that lie between the creases 24 and 25. In this way, the ridges of the creases 25 and 25 do not engage the tape 10 and are protected from wear caused by the tape 10. Since the pressure exerted by the areas 31 on the tape is distributed over a relatively broad region, damage to the liner 23 by the tape is reduced to a minimum.

The supporting pressure applied by the liner 23 on the spools 9 and tape 10 may be increased or decreased depending on the number of radial creases formed therein, which necessarily raises or lowers the number of areas 31 between the creases. Moreover, a desired supporting pressure exerted by the liner 23 may be readily obtained by varying the length of the creases as illustrated by the creases 24 that extend from the margins of central openings 34 in the liner 23 to the periphery thereof and the creases 25 that terminate a short distance from the openings 34. This use of the combination of alternate long and short creases provides the capability of making relatively fine increases or decreases in the centering pressure.

Similar to the liner 13, the liner 23 has a pair of integral tabs 35, and creases may be formed in these tabs as at 36 to increase the biasing pressure the tabs exert on the tape guiding rollers 20.

What is claimed is:

1. A shim liner for a magnetic tape cassette having a case with spaced apart sidewalls, a pair of rotatable tape supporting spools, each journaled on cylindrical ribs at openings in said sidewalls, which sidewalls are formed with two pairs of opposed recessed areas, each pair adjacent one of said spools and positioned near one edge of the periphery of said case, and a tape guide roller rotatably mounted from the sidewalls at each pair of opposed recesses, which liner comprises:

a resilient sheet positioned between the tape supporting spools and one of the sidewalls of said case and having a low friction surface facing said tape supporting spools, said sheet having a pair of openings through which the ribs of said sidewalls protrude and a pair of integral, outwardly extending portions, each overlying at least part of one of the recessed areas of said sidewalls and extending between one end of one of said tape guide rollers and the sidewall at said recessed area for exerting a biasing force on said one of said rollers due to the resiliency of the sheet.

2. A shim liner according to claim 1 wherein each of said outwardly extending portions has at least one crease to increase the biasing effect of said portions on the tape guide rollers.

3. A shim liner according to claim 1 wherein said sheet further includes a plurality of spaced apart creases radially extending outward from each of said openings in said sheet.

4. A shim liner according to claim 3 wherein the liner is positioned in the cassette assembly with the low friction side of said sheet facing said tape supporting spools and the ridges formed by said creases are on the other side of said sheet.

5. A shim liner according to claim 4 wherein said creases alternately extend from the margin of said openings to the periphery of said sheet, and from the margin of said openings to a point between said margin and the periphery of said sheet.

* * * * *